Nov. 13, 1956     E. E. SAUERMAN     2,770,398
DEVICE FOR DISPENSING MEASURED QUANTITIES OF COFFEE
Filed Nov. 3, 1955
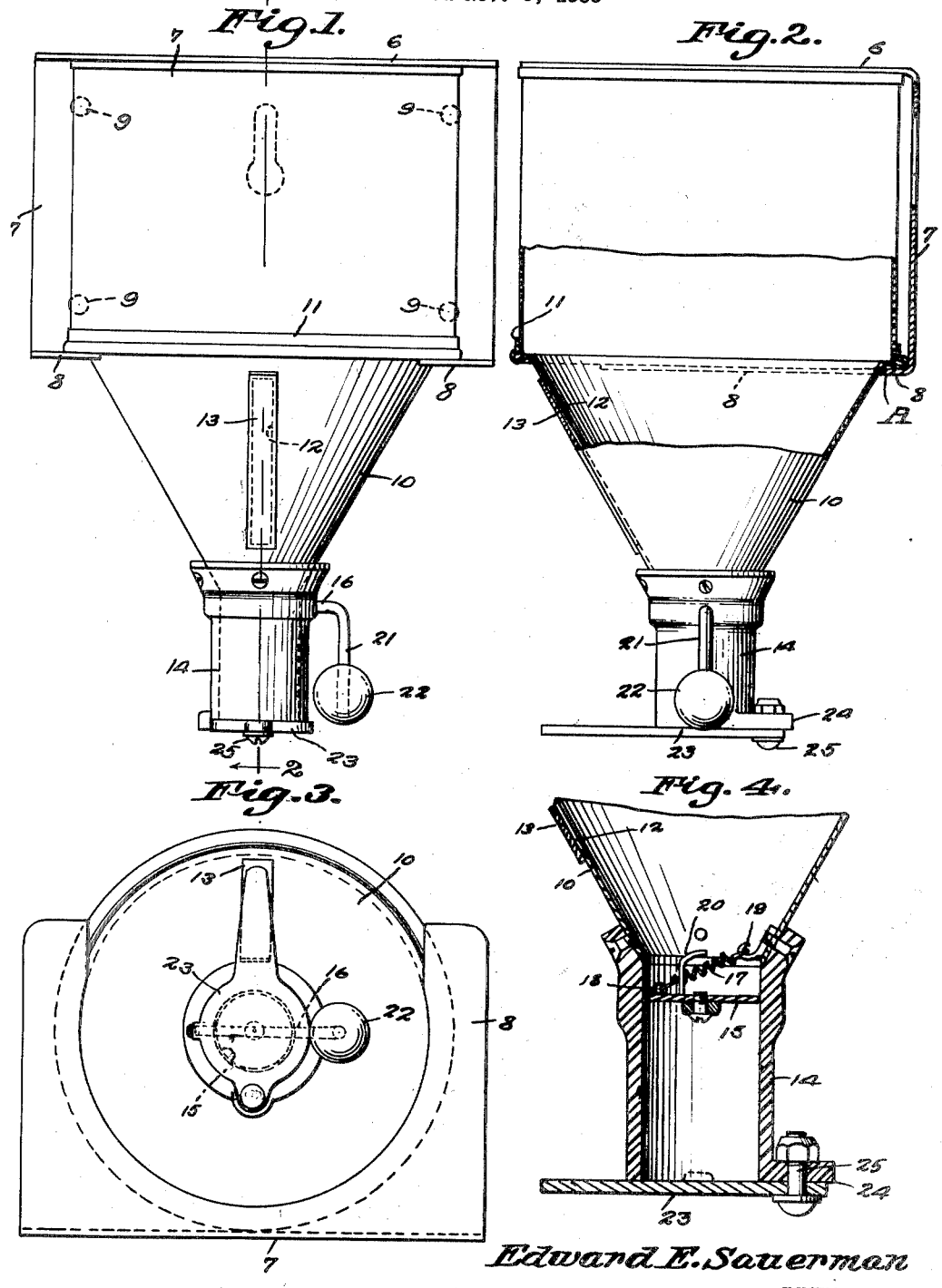
Edward E. Sauerman
INVENTOR
BY C. A. Snow & Co.
ATTORNEYS.

United States Patent Office 2,770,398
Patented Nov. 13, 1956

2,770,398

DEVICE FOR DISPENSING MEASURED QUANTITIES OF COFFEE

Edward E. Sauerman, Miami, Fla.

Application November 3, 1955, Serial No. 544,670

1 Claim. (Cl. 222—181)

This invention relates to a device designed for dispensing granular materials such as coffee.

The primary object of the invention is to provide a dispensing device of this character which will dispense a measured quantity of coffee with each operation of the valve to release the coffee from the device.

An important object of the invention is to provide means for dispensing only the required amount of coffee for a given quantity of beverage, thereby eliminating the element of chance in selecting the desired amount of coffee for the making of perfect tasting coffee.

Still another object of the invention is to provide a dispenser which will be supported by a wall bracket, and is of the type wherein the can in which the coffee is packaged, is inverted in the holder or bracket and used as the container for the coffee being dispensed.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a front elevational view of a coffee dispensing device constructed in accordance with the invention.

Figure 2 is a side elevational view thereof, a portion of the hopper of the device being shown in section.

Figure 3 is a bottom plan view of the device.

Figure 4 is a sectional view taken on line 4—4 of Figure 1.

Referring to the drawing in detail, the device comprises a bracket indicated generally by the reference character 5, the bracket being constructed preferably of a length of sheet metal material constructed to provide an upper horizontal section 6, a rear supporting section 7 and a lower section 8. The lower section 8 is formed with a circular cut away portion providing a clearance for the funnel-shaped body portion of the dispenser, to be hereinafter more fully described.

Openings 9 are provided in the rear supporting section for the reception of securing screws by means of which the bracket may be securely fastened to a supporting surface.

The horizontal section 6 and lower section 8 are disposed in parallel spaced relation with respect to each other, the distance between the sections 6 and 8 being equal to the depth of the conventional coffee can, so that when a coffee can is positioned between the sections 6 and 8, the coffee can will be securely gripped between the sections 6 and 8 to prevent movement thereof when the device is being used in dispensing coffee.

The body portion of the dispenser is funnel-like in formation and is indicated by the reference character 10, the upper diameter of the body portion being such that the open end of a coffee can will fit into the flange 11 that extends upwardly from the upper end of the body portion, as better shown by Figure 2 of the drawing.

A sight opening indicated by the reference character 12 is formed in the side of the body portion 10 and this opening is protected by the transparent member 13, so that the person operating the device may at a glance determine the quantity of coffee remaining in the coffee can which is supported at the upper end of the body portion, and the funnel-like body portion.

An extension or delivery member indicated by the reference character 14 forms a part of the body portion 10, and provides a support for the disc valve 15 which is pivotally mounted on the shaft 16 that extends transversely through the extension 14. A coiled spring indicated by the reference character 17 is connected with the eye 18 that extends upwardly from the disc valve 15, the other end of the spring being secured to the inner surface of the body portion 10 by the hook 19. Thus it will be seen that due to this construction, the spring will act to normally hold the valve 15 closed, or in its horizontal position as better shown by Figure 4 of the drawing.

Rising from the upper surface of the disc valve 15, is an arm 20 that is adapted to contact the inner surface of the extension 14 at the upper end thereof when the valve 15 is swung to an open position, thereby restricting pivotal movement of the disc valve 15 to limit the quantity of coffee passing from the body portion 10 to the extension or delivery member 14 to be delivered into a receptacle at the base thereof.

The shaft 16 is of a length to extend beyond the side of the extension 14, where it is provided with a downturned end 21 on which the ball 22 is mounted, the ball 22 providing a finger piece for effecting movement of the shaft 16 is operating the disc valve 15.

At the lower end of the extension 14 is a pivoted valve 23 that is connected with the laterally extended ear 24 formed at the lower end of the extension or delivery member 14, as clearly shown by Figure 4 of the drawing, the pivoted valve 23 being connected to the ear by means of the pivot pin 25.

Forming a part of the pivoted valve 23 is an operating handle 26 which extends a substantial distance beyond the surface of the extension or delivery member 14 and may be readily gripped by the operator of the device.

An upwardly extended stop 27 is formed on the pivoted valve 23 and is so disposed that it will contact with the outer surface of the extension or delivery member 14 when the valve is moved to its closed position, thereby restricting movement of the pivoted valve 23 to insure the valve 23 being moved to its closed position.

In use, the coffee can in which the coffee is packaged and which, in the present showing, is indicated by the reference character A, is positioned between the sections 6 and 8 of the bracket with the open end of the coffee can disposed downwardly. The open end of the coffee can is fitted within the confines of the flange 11 where it is securely held in place to deliver coffee to the body portion 10.

In the use of the device for dispensing a measured quantity of coffee, the valve 23 is moved to its closed position, and the valve 15 is operated to allow coffee contained in the body portion 10 to gravitate into the extension or delivery member 14. When the extension becomes filled with coffee, it contains a quantity equal to a spoonful. The valve 23 is now operated to release the coffee held between the valves 23 and 15 into a container held on the open end of the extension or delivery member 14. This operation is repeated until the desired quantity of coffee has been discharged from the device.

It will of course be understood that the extension or delivery member 14 is constructed of transparent plastic material so that the quantity of coffee within the extension or delivery member 14 will be clearly visible at all times to aid in operating the valves.

Having thus described the invention,

What is claimed is:

A device for dispensing measured quantities of granular material comprising a bracket formed of a vertical rear wall engageable with a vertical support, an upper horizontal wall projecting from said rear wall and engageable over the inverted bottom of a container, a lower horizontal wall projecting from said rear wall, the inverted open top of said container engaging on said lower wall, said lower wall having an opening extending inwardly from the front edge thereof, a conical member fixed to and depending from said bottom wall, a cylindrical delivery member fixed to the lower end of said conical member, a spring-pressed valve plate in the upper end of said delivery member, a rock shaft fixed to said valve plate, a right-angled arm extending from one end of said shaft, a weight on said arm gravitatingly maintaining said valve plate in closed position, a second valve plate bearing against the lower end of said delivery member, means pivotally securing said second valve plate to said delivery member, and a handle projecting from said second valve plate.

References Cited in the file of this patent

UNITED STATES PATENTS

| | | |
|---|---|---|
| 1,349,842 | McKinley | Aug. 17, 1920 |
| 1,643,828 | Young | Sept. 27, 1927 |
| 1,658,257 | Rogginger | Feb. 7, 1928 |
| 2,056,096 | Etter | Sept. 29, 1936 |
| 2,072,938 | Berg | Mar. 9, 1937 |